US007010584B1

(12) United States Patent
Craft

(10) Patent No.: US 7,010,584 B1
(45) Date of Patent: *Mar. 7, 2006

(54) CHANGING THE OPERATING SYSTEM IN A COMPUTER OPERATION WITHOUT SUBSTANTIAL INTERRUPTION OF OPERATIONS THROUGH THE USE OF A SURROGATE COMPUTER

(75) Inventor: Julie Levell Craft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 849 days.

This patent is subject to a terminal disclaimer.

(21) Appl. No.: 09/710,919

(22) Filed: Nov. 9, 2000

(51) Int. Cl.
*G06F 15/177* (2006.01)
(52) U.S. Cl. .................................. 709/220
(58) Field of Classification Search ........... 709/221, 709/222, 220
See application file for complete search history.

(56) References Cited

U.S. PATENT DOCUMENTS 6,119,212 A * 9/2000 Gross et al. ............. 711/173
6,128,734 A * 10/2000 Gross et al. ............. 713/100
6,295,591 B1 * 9/2001 Bealkowski et al. ...... 711/165
6,484,309 B1 * 11/2002 Nowlin et al. ............ 717/100
6,487,718 B1 * 11/2002 Rodriguez et al. ........ 717/177

\* cited by examiner

Primary Examiner—Jason Cardone
Assistant Examiner—Thomas Duong
(74) Attorney, Agent, or Firm—Jerry B. Kraft; Mark S. Walker; Volel Emile

(57) ABSTRACT

The current operating system on the primary computer system continues to run, i.e. the computer system on which the operating system is to be changed. A second computer or surrogate computer system with the new operating system to eventually be installed in said first computer system to replace the current operating system. The root volume group of stored data from said first or primary computer system is copied to a computer readable/writable medium external to this first computer system and this root volume group is installed from the computer readable/writable medium into the surrogate or second computer system. This second computer system is run with said root volume group of data to thereby update said root volume group. Now, the upgraded root volume group, including the new operating system, is copied back from the surrogate computer system and reinstalled into said first computer system.

15 Claims, 4 Drawing Sheets

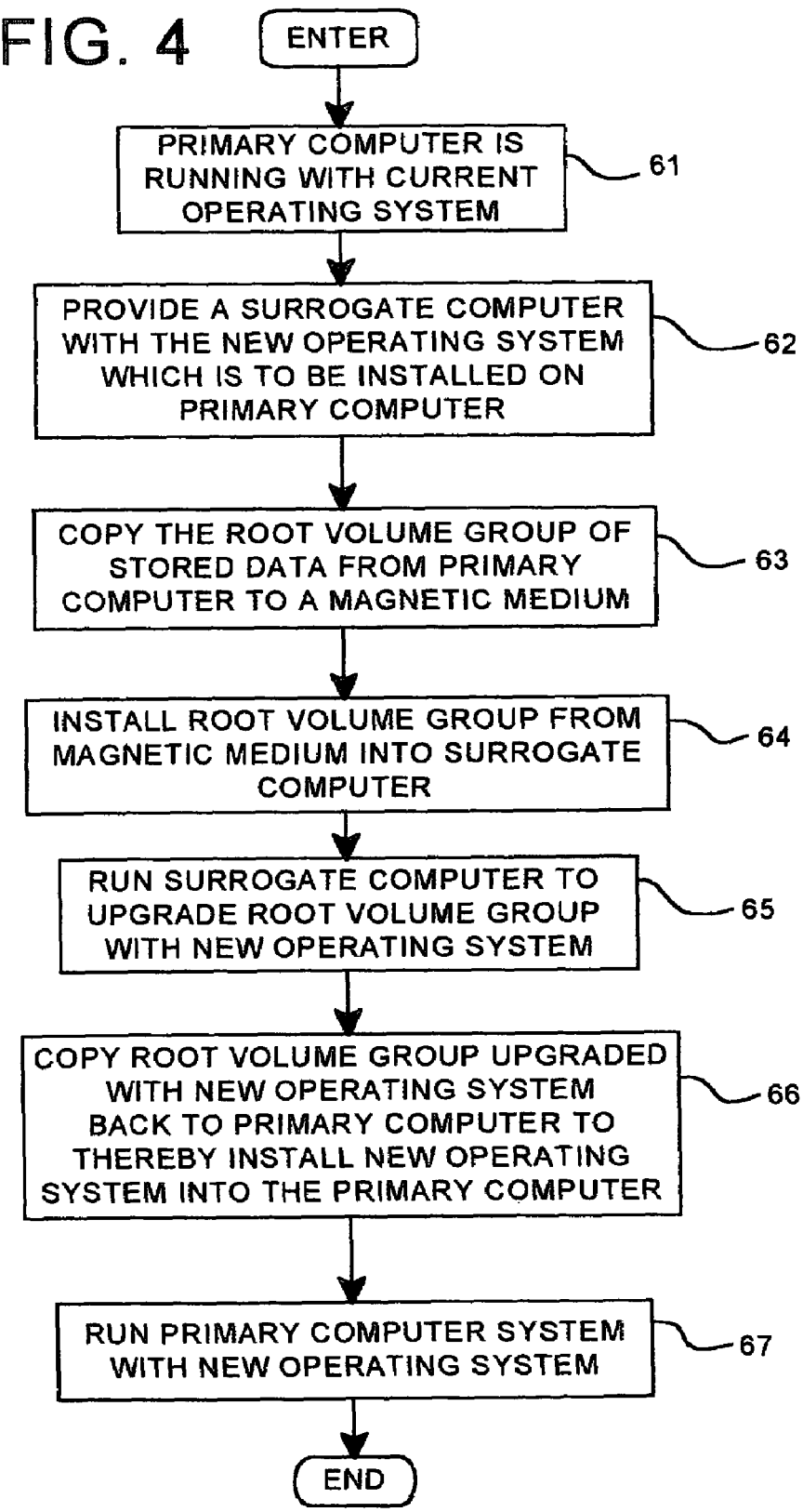

CHANGING THE OPERATING SYSTEM IN A COMPUTER OPERATION WITHOUT SUBSTANTIAL INTERRUPTION OF OPERATIONS THROUGH THE USE OF A SURROGATE COMPUTER

TECHNICAL FIELD

The present invention relates to the upgrading or modifying of computer software and programs and particularly to the upgrading or changing of computer operating systems.

BACKGROUND OF RELATED ART

Computers and their application programs are used in all aspects of business, industry and academic endeavors. In recent years, there has been a technological revolution driven by the convergence of the data processing industry with the consumer electronics industry. This advance has been even further accelerated by the extensive consumer and business involvement in the Internet. As a result of these changes, it seems as if virtually all aspects of human productivity in the industrialized world requires human/computer interaction. The computer industry has been a force for bringing about great increases in business and industrial productivity. Almost every week seems to bring computer industry advances which promise even further increases in productivity. These advances offer to drive down business and industry costs and increase efficiency, as well as increasing productivity. In addition, the cost of "computer power" continues to drop as a result of rapid advances in computer related technologies.

Despite all of these advantages, there still remains great resistance in all industries and business fields to new computer systems and significant system upgrades which offer much in productivity increases. This resistance results from past experience that equates installing new computer systems or significant upgrades in existing systems with large amounts of down time, during which the business, manufacturing facility or individual worker functions are inoperative or operate at diminished levels. This is particularly the case when a new computer operating system or significant operating system upgrade is being considered. When a business or production facility is trying to decide whether to install a new computer operating system the concern about down time, the possible loss of business, as well as stress on the workers involved very often outweighs the cost of the installation in influencing the decision. The concern about business and production delays resulting from installation has become so great that fewer small businesses are trying to make system and program changes on their own. However, even with professional installation, business inconvenience and delays may be quite substantial when new or significantly upgraded operating systems are being installed.

The designers of new or significantly upgraded operating systems for computers try, and to great extent succeed in, anticipating all possible configurations. However, even these astute groups cannot be "all things for all people". There are bound to be computer operation configurations which cause problems for the new operating system which are time consuming to address. A great many business computer operations cannot tolerate such down time. Consequently, the operating system installation art is constantly seeking implementations for reducing such down time.

SUMMARY OF THE PRESENT INVENTION

The present invention provides an implementation for significantly reducing the possible down time in the installation of new operating systems to replace current operating systems by effecting such change substantially without interruption of ongoing operations.

The process involves continuing to run the current operating system on the primary computer system, i.e. the computer system on which the operating system is to be changed. Then providing a second computer or surrogate computer system with the new operating system to be eventually installed in said first computer system to replace the current operating system. The root volume group of stored data from said first or primary computer system is copied to a computer readable/writable medium external to this first computer system and this root volume group is installed from the computer readable/writable medium into the surrogate or second computer system. This second computer system is run with the root volume group of data to thereby upgrade said root volume group with said new operating system.

During the running of this root volume group on the surrogate system with the new operating system, most of the installation problems may be ironed out. Also, since the root volume group installed on the surrogate computer includes all of the application programs and at least some database files of the primary computer, any configuration problems of the primary computer system relative to the new operating system may be found and solved on the surrogate computer system while the business continues with the current operating system on the primary computer.

At this point, the root volume group upgraded with the new operating system is copied back from the surrogate computer system and reinstalled into said first computer system. This reinstalled root volume group will now be in updated form to include any changes made to solve the above-mentioned computer system configuration problems with respect to the new operating system. This completes the operating system transition.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 4 is an illustrative flowchart describing the setting up of the elements of a program according to the present invention for the changing of operating systems in computer operations with substantially no interruption in the computer operation.

DETAILED DESCRIPTION OF THE PREFERRED EMBODIMENT

Figure 1:
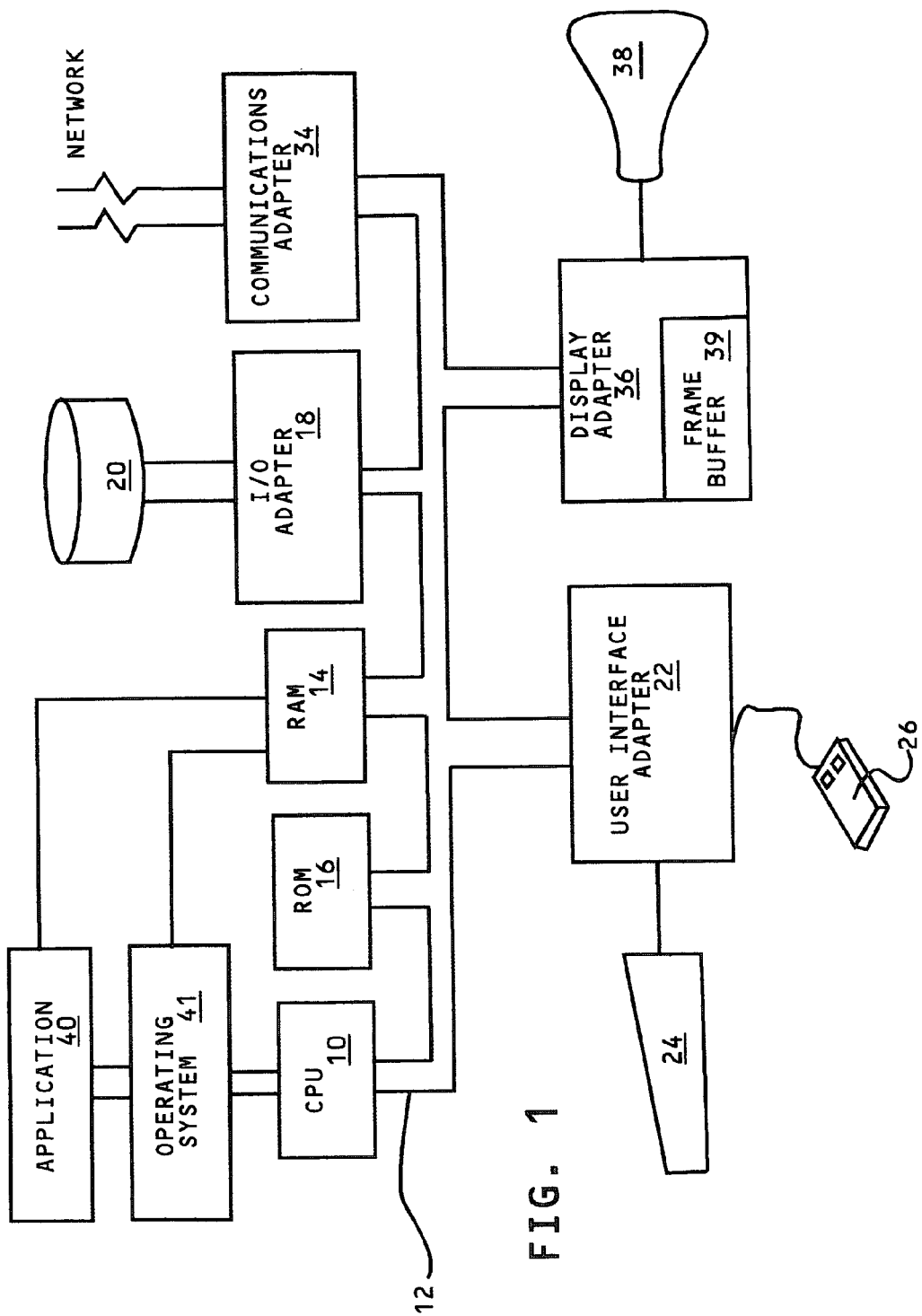
FIG. 1 is a block diagram of an interactive data processor controlled display system including a central processing unit which is illustrative of a primary computer system of the present invention for which the operating system is to be changed; it is also illustrative of the surrogate computer system used in this invention.

Referring to FIG. 1, a typical data processing terminal is shown which may function as either the primary computer system which is to have its operating system changed or the surrogate computer on which the new operating system is run with the root volume group copied from the primary computer. The operations involving the transitional surrogate computer will be hereinafter described in detail with respect to the logic layouts of FIGS. 2 and 3 and the programming flowchart of FIG. 4.

A central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows98™ or WindowsNT™, as well as UNIX and AIX operating systems. Whatever the operating system, there will subsequently be described how such an operating system may be changed. Application programs 40, controlled by the system, are moved into and out of the main memory Random Access Memory (RAM) 14. These programs include the programs of the present invention for changing the operating system of a computer without substantial interruption in continuous routine computer operations. The program of the present invention is normally run on the primary computer. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the data processing system to communicate with other such systems over a Local Area Network (LAN) or a Wide Area Network (WAN), which includes, of course, the World Wide Web (Web) or Internet. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web pages. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 2:
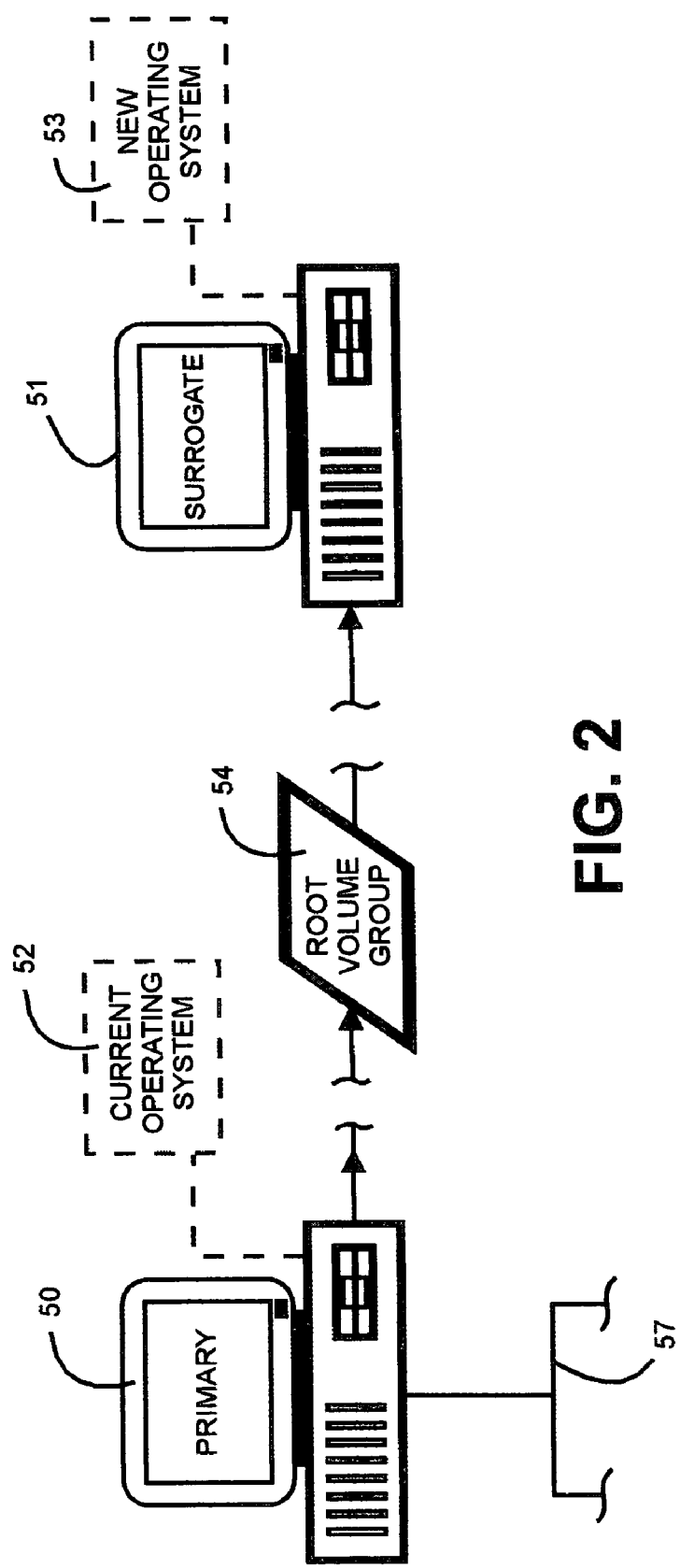
FIG. 2 is a generalized diagrammatic circuit view of the initial relationship between the primary and surrogate computer operations in accordance with this invention.

A generalized diagram showing how the present invention may be carried between the primary and surrogate computer systems is shown in FIG. 2. The primary computer system 50 is shown operating with a current operating system 52 which is to be changed. A surrogate computer system 51 is already set up with the new operating system 53 which is to be installed on primary computer 50. First, a copy or clone of the whole root volume group of data from computer system 50 is recorded on a magnetic medium 54 and installed as shown in surrogate computer 51. This root volume group usually includes all of the programs in the primary computer including the application programs, as well as the current operating system. At the very least, the copied programs should be sufficient to boot either the primary or the surrogate computers. This cloned root volume group may also include databases associated with the primary computer system 50. The magnetic medium used for this transfer medium 54 may be any standard disk, diskette or writable Zip drive. Also, writable CDs and DVDs may be used such as CD-RW (CD-ReWritable), CD-R (CD-Recordable), DVD-RAM, DVD+RW and DVD-R.

When the transfer of the root volume group is completed, then surrogate computer 51 with new operating system 53 will integrate with the root volume group clone on surrogate computer 51 while primary computer system 50 still controls its components through connections 57 under the control of current operating system 52. In the meantime, there is an opportunity for surrogate computer 51 to address any configuration problems which the primary computer system may encounter relative to the new operating system. Such may be found and solved on the surrogate computer system, which already has the root volume group of the primary computer, while the business continues with the current operating system on the primary computer.

Figure 3:
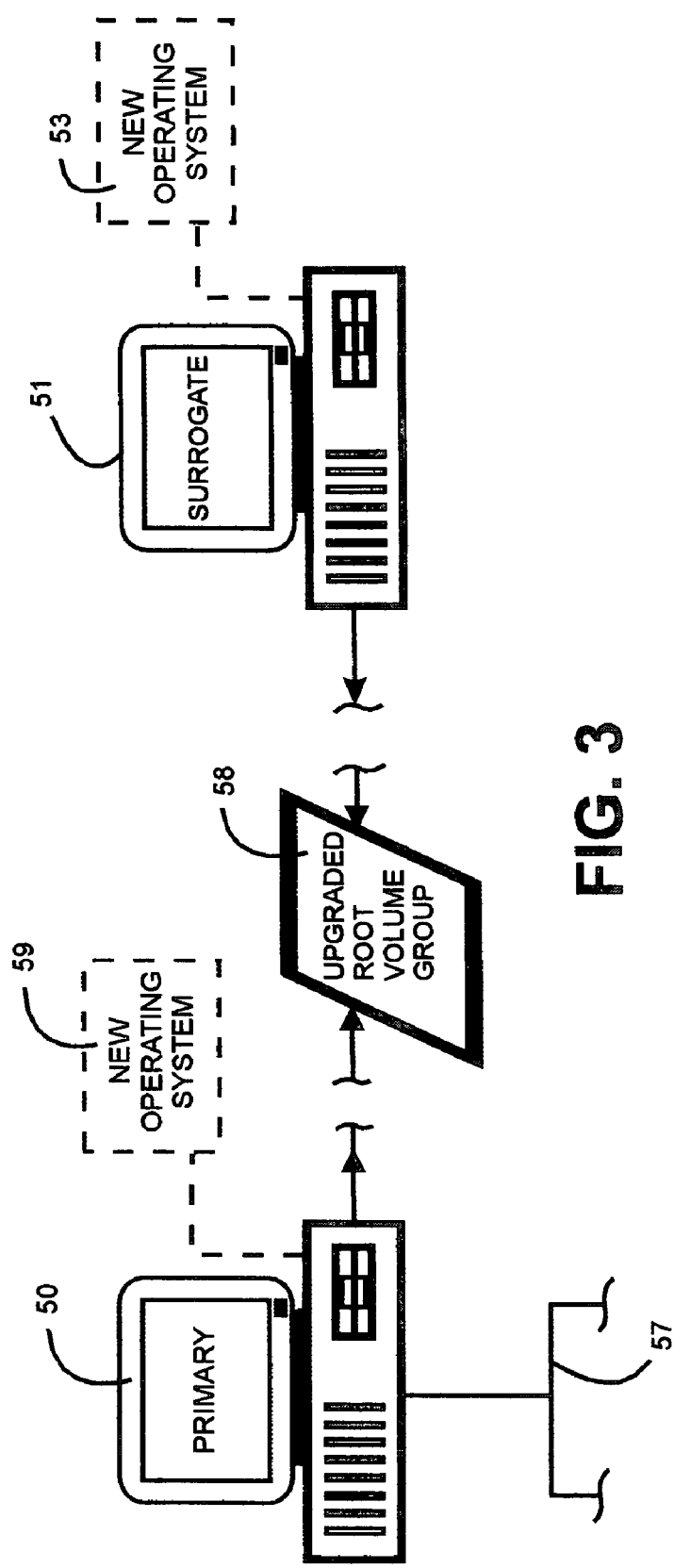
FIG. 3 is a generalized diagrammatic circuit view of the final relationship between the primary and surrogate computer operations in accordance with this invention.

When, as indicated in FIG. 3, the installation and integration of the new operating system 53 with respect to the root volume group clone on surrogate computer 51 is completed, the root volume group upgraded with the new operating system as a result of the transitory functioning under the control of surrogate computer 51 is recorded onto transfer medium 58 and reinstalled into primary computer 50. This reinstalled root volume group will now be in updated form to include any changes made to solve the above-mentioned computer system configuration problems with respect to the new operating system. This completes the operating system transition and the new operating system 59 is now installed on the primary computer system.

FIG. 4 is a flowchart showing the development of a process according to the present invention for providing the transition in a computer system from a current to a new operating system through the transitory use of a surrogate computer with an installed clone of the computer system's root volume group. A primary computer with the current operating system is running and continuously conducting transactions appropriate to its business environment, step 61. A surrogate computer is provided which already has the new operating system to be installed on the primary computer, step 62. Then, the following program has been developed which operates in the primary computer to install the new operating system in the following steps. The root volume group of stored data including application programs and the current operating system is copied or cloned onto a transfer medium, conveniently magnetic, step 63, while the primary computer continues to operate with the current operating system. The root volume group is installed from the transfer medium into the surrogate computer, step 64. When the root volume group is installed and integrated with the new operating system so as to be fully compatible and functional within the surrogate computer, step 65, then, step 66, the root volume group upgraded with the new operating system is set up to be copied back and reinstalled into the primary computer. When the reinstallation of the new operating system into the primary computer is thus completed, the primary computer system runs its normal operations, step 67.

One of the preferred implementations of the present invention is in application program 40, i.e. a program made up of programming steps or instructions resident in RAM 14, FIG. 1, of the primary computer. Until required by the computer system, the program instructions may be stored in another readable medium, e.g. in disk drive 20 or in a removable memory such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

The invention claimed is:

1. A method for changing the operating system in a computer operation without any substantial interruption in the computer operation comprising:
   running a first computer system with a current operating system;
   providing a second computer system with a new operating system to be installed in said first computer system to replace said current operating system;
   copying the root volume group of stored data from said first computer system to a computer readable/writable medium external to said first computer system;
   installing said root volume group of data from said computer readable/writable medium into said second computer system;
   running said second computer system with said root volume group of data to upgrade said root volume group with said new operating system; and
   reinstalling said root volume group upgraded with said new operating system into said first computer system.

2. The method of claim 1 wherein said computer readable/writable medium is a magnetic medium.

3. The method of claim 1 wherein said root volume group comprises at least a group of logical volumes sufficient to boot each of the first and second computer systems.

4. The method of claim 3 wherein said root volume group copied from said first computer system comprises the current operating system and the application programs in said first computer system.

5. The method of claim 4 wherein said root volume group copied from said first computer system further includes databases.

6. A system for changing the operating system in a computer operation without any substantial interruption in the computer operation comprising:
   a first computer system with a current operating system;
   a second computer system with a new operating system to be installed in said first computer system to replace said current operating system;
   means for copying the root volume group of stored data from said first computer system to a computer readable/writable medium external to said first computer system;
   means for installing said root volume group of data from said computer readable/writable medium into said second computer system;
   means for running said second computer system with said root volume group of data to upgrade said root volume group with said new operating system; and
   means for reinstalling said root volume group upgraded with said new operating system into said first computer system.

7. The system of claim 6 wherein said computer readable/writable medium is a magnetic medium.

8. The system of claim 6 wherein said root volume group comprises at least a group of logical volumes sufficient to boot each of the first and second computer systems.

9. The system of claim 8 wherein said root volume group copied from said first computer system comprises the current operating system and the application programs in said first computer system.

10. The system of claim 9 wherein said root volume group copied from said first computer system further includes databases.

11. A computer program having code recorded on a computer readable medium for changing the operating system in a computer operation without any substantial interruption in the computer operation comprising:
    means for copying the root volume group of stored data from a first computer system with a current operating system to a computer readable/writable medium external to said first computer system;
    means for installing said root volume group of data from said computer readable/writable medium into a second computer system with a new operating system to be installed in said first computer system to replace said current operating system;
    means for running said second computer system with said root volume group of data to upgrade said root volume group with said new operating system; and
    means for reinstalling said root volume group upgraded with said new operating system into said first computer system.

12. The computer program of claim 11, wherein said computer readable/writable medium is a magnetic medium.

13. The computer program of claim 11 wherein said root volume group comprises at least a group of logical volumes sufficient to boot each of the first and second computer systems.

14. The computer program of claim 13 wherein said root volume group copied from said first computer system comprises the current operating system and the application programs in said first computer system.

15. The computer program of claim 14 wherein said root volume group copied from said first computer system further includes databases.

* * * * *